United States Patent
Swanson et al.

(10) Patent No.: US 7,373,180 B2
(45) Date of Patent: May 13, 2008

(54) METHOD AND APPARATUS FOR ACCENTUATING GRAPHICAL ELEMENTS ON A MOBILE HANDSET HOUSING

(75) Inventors: Jeff Swanson, Erie, CO (US); Jeff Wendorff, San Diego, CA (US); Ted Santos, Boulder, CO (US); Ivan Brosseau, Montreal (CA); Gad Shannan, Montreal (CA)

(73) Assignee: Kyocera Wireless Corp., San Diego, CA (US)

( * ) Notice: Subject to any disclaimer, the term of this patent is extended or adjusted under 35 U.S.C. 154(b) by 824 days.

(21) Appl. No.: 09/866,003

(22) Filed: May 25, 2001

(65) Prior Publication Data

US 2002/0177470 A1  Nov. 28, 2002

(51) Int. Cl.
*H04B 1/38* (2006.01)
*H04M 1/00* (2006.01)

(52) U.S. Cl. ............... 455/566; 455/90.3; 455/550.1; 455/575.1; 455/575.8; 379/368; 379/433.06; 379/433.07

(58) Field of Classification Search .......... 379/433.04, 379/368, 433.06, 433.07; 455/550.1, 90.3, 455/575.1, 575.8, 566
See application file for complete search history.

(56) References Cited

U.S. PATENT DOCUMENTS

| | | | | |
|---|---|---|---|---|
| 4,734,679 A | * | 3/1988 | Haskins | 341/22 |
| 5,911,121 A | * | 6/1999 | Andrews | 455/418 |
| 5,916,450 A | * | 6/1999 | Muggli et al. | 216/4 |
| 6,001,516 A | * | 12/1999 | Gasper | 430/10 |
| 6,046,730 A | * | 4/2000 | Bowen et al. | 345/168 |
| 6,060,157 A | * | 5/2000 | LaPerre et al. | 428/325 |
| 6,259,044 B1 | * | 7/2001 | Paratore et al. | 200/5 A |
| 6,346,973 B1 | * | 2/2002 | Shibamoto et al. | 349/69 |
| 6,415,138 B2 | * | 7/2002 | Sirola et al. | 455/90.1 |
| 6,626,203 B1 | * | 9/2003 | Schneider | 137/270 |
| 6,898,283 B2 | * | 5/2005 | Wycherley et al. | 379/433.11 |
| 7,035,088 B2 | * | 4/2006 | Pihlaja et al. | 361/679 |
| 7,056,043 B2 | * | 6/2006 | Pletikosa | 400/472 |
| 7,164,087 B2 | * | 1/2007 | Levy | 200/5 A |
| 2002/0071550 A1 | * | 6/2002 | Pletikosa | 379/433.01 |
| 2002/0077156 A1 | * | 6/2002 | Smethers | 455/566 |
| 2002/0109614 A1 | * | 8/2002 | Kim | 341/23 |
| 2003/0020682 A1 | * | 1/2003 | Tamaki | 345/92 |
| 2003/0186729 A1 | * | 10/2003 | Engstrom et al. | 455/575.8 |
| 2004/0085360 A1 | * | 5/2004 | Pratt et al. | 345/773 |
| 2004/0110526 A1 | * | 6/2004 | Volland | 455/550.1 |
| 2004/0248621 A1 | * | 12/2004 | Schon | 455/566 |

FOREIGN PATENT DOCUMENTS

| | | | |
|---|---|---|---|
| DE | 19918055 | * | 11/2000 |
| EP | 964417 A2 | * | 12/1999 |
| EP | 1091540 A2 | * | 4/2001 |
| JP | 864432 A2 | * | 9/1998 |

* cited by examiner

*Primary Examiner*—Sujatha Sharma

(57) ABSTRACT

A transparent mobile handset housing with graphical elements such as alphanumeric characters, icons, and logos positioned directly onto the housing with visibility enhanced through backlighting. The transparent housing is covered with an opaque coating and omitted portions of the opaque coating form a negative image of the graphical elements, or the housing is left transparent and opaque graphical elements are coated onto the housing. A backlighting source from within the housing, such as an array of light emitting diodes or an electroluminescent panel, provides illumination to the housing. In the case of negatively imaged graphical elements, the graphical elements are illuminated. In the case of opaque graphical elements, the surrounding transparent housing is illuminated.

11 Claims, 2 Drawing Sheets

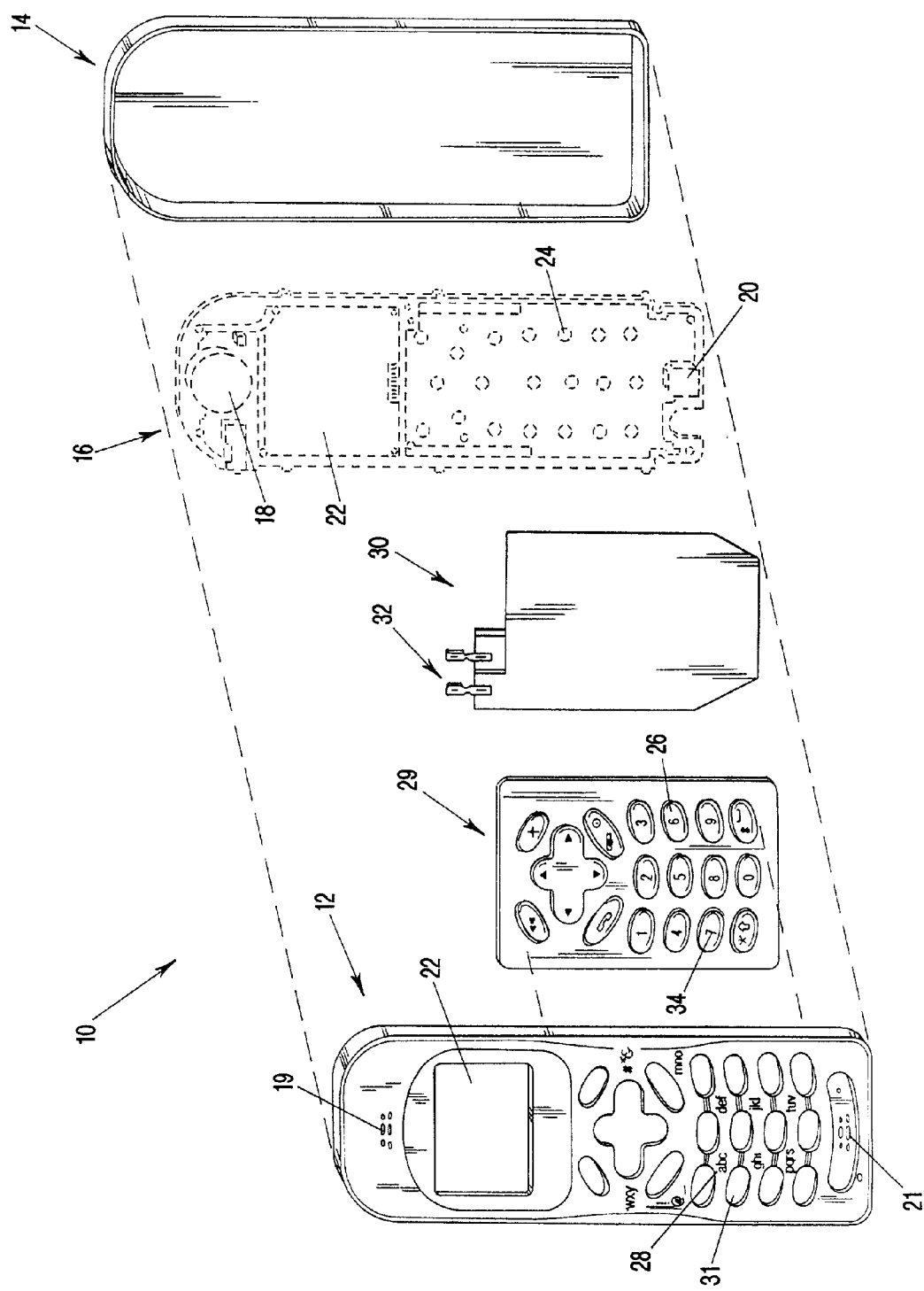

METHOD AND APPARATUS FOR ACCENTUATING GRAPHICAL ELEMENTS ON A MOBILE HANDSET HOUSING

BACKGROUND OF THE INVENTION

1. Field of the Invention (Technical Field)

The present invention relates to accentuating graphical elements on a housing, in particular to icons, alphanumeric characters, and logos located on a mobile handset housing.

2. Background Art

Mobile telephone handsets typically comprise a rigid housing enclosing a printed circuit board, the associated electronic and electro-acoustic components, and an antenna, through which radio frequency (RF) signals are transmitted and received. The telephone user interfaces with the circuitry and microprocessor of the telephone through a keypad located on the front outer surface of the housing. This keypad is often located on the same face of the housing as the microphone and speaker through which the user speaks and listens during communication. Keys on the keypad are pressed by the user to temporarily close an internal switch and send a signal to the microprocessor of the telephone where an appropriate routine processes the input and performs the desired function. Graphical elements, including alphanumeric characters and icons, are located on or adjacent the keys to guide the user in interfacing with the telephone. For example, the numbers 0-9 may be located on the keys, as well as letters of the alphabet, the pound and asterisk signs, and a variety of menu navigation symbols. A display above the keypad on the telephone housing often provides menus, messaging, and readouts of data input by the user. Further, the manufacturer of the telephone or the service provider may provide one or more logos on the housing to build brand awareness. Accordingly, it is important that the logo be prominently positioned to increase user perception. However, due to the physical space constraints on a mobile handset, the logo or logos may be of limited size and perceptibility. Also, the logos are merely printed on or attached to the housing, so are not visible in a darkened environment.

In order to enhance visibility of the alphanumeric characters or icons located on the keys of the keypad, lighting is often provided from behind the keypad and within the telephone housing to illuminate either the graphical elements on the keys or the keys themselves. Backlighting is typically provided from an array of light emitting diodes (LEDs) or an electroluminescent (EL) panel located directly behind the keypad. Each LED may be located behind a particular key or the array may be located generally behind the keypad to provide diffuse lighting. This type of backlighting illuminates the keypad material surrounding the graphics in the case where the graphics are more opaque than the keys of the keypad, for example, when the graphics are black and the keys are white. Alternatively the backlighting illuminates the graphics in the case where the keys are opaque in comparison to the graphics, for example, when the graphics are white and the keys are black. The LED array is powered from the power supply for the telephone electronics, which is typically a battery, and is illuminated upon activation of the telephone, such as when the user turns on the telephone, when a call is made, or when a call is answered.

The prior art method of placing graphics on the keys of a telephone limits the graphics configuration available to the telephone manufacturer to that on the keypad designed for its telephones. For example, only a very limited amount of information may be positioned on a typical key. Further, when graphics are located on the keypad, they are constantly being contacted by the user's fingertips when interfacing with the telephone potentially causing wear and fading of the graphics. This inhibits the user's ability to view the graphics and limits the useful life of the telephone. Also, when user interface graphics are located only on the keys, the keys must be made of a material than can be illuminated to enhance the visibility of the graphics.

SUMMARY OF THE INVENTION

Disclosure of the Invention

A primary object of the present invention is to provide accentuated graphical elements upon the surface of a mobile handset housing. Another primary object of the present invention is to illuminate these graphical elements with a backlighting source that is enclosed within the housing.

The present invention provides a mobile handset housing with graphical elements such as alphanumeric characters, icons, or logos positioned directly on the housing. Visibility of the graphical elements is enhanced through backlighting. Accentuation is achieved by constructing an opaque housing portion with transparent graphical elements, or constructing a transparent housing portion with opaque graphical elements. The present invention overcomes the limitations of prior art keypad graphics and illumination by placing illuminated graphical elements on the mobile handset housing rather than on the keypad. This provides increased graphics design flexibility and decreased wear and fading of selected graphical elements. Any of a variety of key materials, including plastics, molded metals, as well as silicon rubber, can be used with the present invention because the keys do not have to be made of a material that can be illuminated with backlighting.

Advantageously, the present invention provides an accentuated user interface configuration that is located on the telephone housing. Accordingly, logos and other graphical elements on the housing may be accentuated by illumination. Another advantage of the invention is that graphical elements may be located on the housing, where the graphical elements will not be subjected to a reduction in fading and wear due to ongoing contact with a user's fingers. Still another advantage of the present invention is that a wider variety of types of keys may be used with the telephone. As the graphical elements may be located entirely on the housing rather than on the keys, there is no need for a special type of key to illuminate graphics on the key. Yet another advantage of the invention is the ability to alter the graphics configuration from one telephone housing to the next while maintaining the same keypad.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention. In the drawings:

FIG. 2 is an exploded view of the mobile telephone handset of FIG. 1 showing an electroluminescent panel as the backlighting source located behind the front surface of the housing for illuminating graphical elements.

DESCRIPTION OF THE PREFERRED EMBODIMENTS

Figure 1:
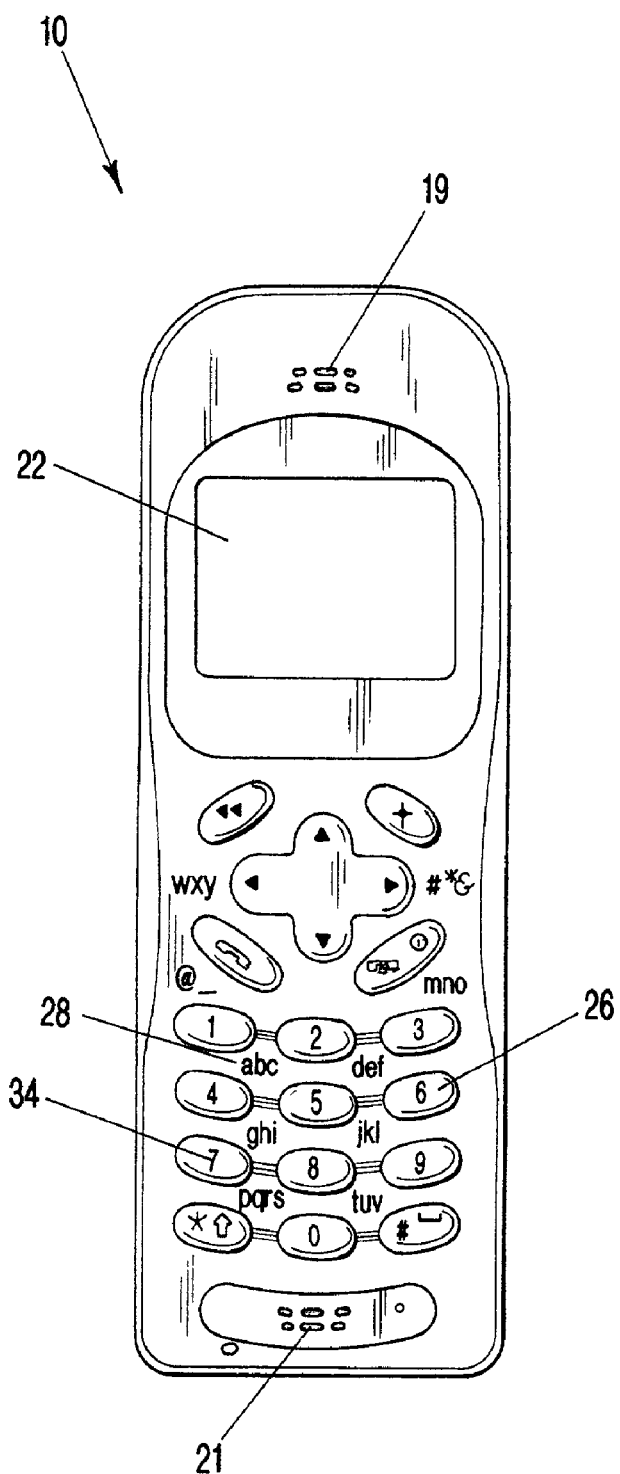
FIG. 1 is a mobile telephone handset of the present invention with graphical elements located on the front outer surface of the handset housing.

Best Modes for Carrying out the Invention

The present invention is a method and apparatus for positioning graphical elements on the housing of a mobile telephone handset and illuminating the graphical elements from behind the housing with a suitable lighting source. In a first embodiment, the housing is formed from an opaquely-coated transparent, preferably translucent, material. A negative image of each graphical element is formed in the opaque coating on the housing. In a second embodiment, the housing is formed from a translucent material with opaque graphical elements applied onto the housing. In either embodiment, a backlighting source, such as an array of LEDs or an EL panel, is located directly behind the face of the housing where the graphical elements are located. The backlighting source is powered to illuminate either the graphical elements themselves or the housing surrounding the graphical elements so that they are clearly visible to the user.

As used herein, the term "graphical elements" includes alphanumeric characters, icons, logos, and any other type of symbol located on the telephone. "Transparent" is defined here to mean that light rays can be transmitted to a sufficient extent that a viewer can see at least a portion of the light transmitted through a material. "Translucent" is defined here as transparent and light diffusive. "Opaque" is defined here as sufficiently inhibiting the passage of light to an extent that substantially all of the light does not pass through to the viewer.

Referring to FIG. 1, a mobile handset 10 incorporating the present invention is shown. As seen in FIG. 2, an exploded view of the mobile handset 10, a rigid housing includes a front portion 12 and rear portion 14 that fit together to enclose communication electronics 16 which generally include a printed circuit board, the associated electronic and electro-acoustic components, and an antenna. The user listens to received audio signals from speaker 18 positioned behind openings 19 and speaks through microphone 20 positioned behind openings 21. A display 22 provides menus, messaging, and a readout of user input data. An array of electronic push button switches, one of which is shown at 24, correspond to, and are activated by, user push button keys 26 protruding from the front portion of the housing 12. Keys 26 make up keypad 29 that fits behind housing front portion 12; individual keys 26 protrude through corresponding openings, one of which is shown at 31, in housing front portion 12.

Graphical elements, such as shown at 28, are located on the outer surface of the front portion of the housing 12. Graphical elements as shown at 28 are located nearest the key that the user must press to activate the function indicated by the graphical elements. Optionally, some graphical elements remain on the keys of the keypad as shown at 34. An EL panel 30 is used as a source for backlighting and is located directly behind the front portion of the housing 12, between keypad 29 and communication electronics 16. EL panel 30 provides illumination to the front housing 12 and enhances visibility of the graphical elements. EL panel 30 is connected to a power supply at 32. A backlighting source can alternatively be located between the front housing 12 and keypad 29 if it is configured so that it does not obstruct the operation of keypad 29. The backlighting source need only be sufficiently close to the front housing 12 so that it provides the required level of illumination to the housing, and so that its light is unobstructed. Optionally, an array of LEDs or other suitable backlighting source can be substituted in place of EL panel 30. A combination of different backlighting sources can also provide the necessary backlighting.

In a first embodiment, the front 12 and rear 14 portions of the housing are preferably molded of a translucent or transparent material, such as polycarbonate or acrylic, or any equivalent material. Alternatively, a diffuser can be added to the resin of the housing to improve light distribution. If the housing material is highly translucent, then a diffuser may not be required. However, this embodiment can also be implemented with a transparent housing that is not translucent. The outer surface of the housing is coated with at least one layer of an opaque coating. Such a coating could include paint, ink, or a variety of films, applied in any industry-standard decorating process including painting, pad printing, and in-mold decorating processes. The coating can cover any portion of the outer surface of the front 12 and rear 14 portions of the housing, so long as that part of the housing where the graphical elements are to be located is coated. Preferably, at least the outer surface of the front housing is coated, as that is where keypad 29 is likely to be located. Alternatively the inner surface or surfaces of the housing can be coated instead of or in addition to the outer surface. The invention is described here as if the graphical elements are located on the outer surface of the front housing 12 and as if the coating covers at least this surface. It is to be understood that the invention is equally applicable if the graphical elements are located elsewhere on the housing.

A "negative image" of the graphical elements is formed in the opaque coating on the outer surface of the front housing 12 through the decorating process or by subsequent removal of portions of the coating to reveal the transparent housing beneath. "Negative image" is used herein to refer to an image that is light against a dark background, as opposed to a dark image that is against a light background. For example, portions of the coating can be removed by a programmable laser-etching process that is well known in the art, to position the graphical elements on the housing 12. Laser etching software routines are relatively easy to customize for the manufacturing process, making this technique useful where flexibility in graphics configuration is desired.

In the first embodiment, visible backlighting is emitted through the negative image on the housing 12, and is blocked, i.e., not emitted, by the opaque coating on the remaining portions of housing 12. This results in the graphical elements being illuminated and clearly visible to the user when the backlighting source receives power. It is to be understood that if the inner surface of the housing is coated, then the reverse, negative image of the graphical elements is formed in the coating on the inner surface to create an allochiral image of the graphical elements.

In a second embodiment, the front 12 and rear 14 portions of the housing are again preferably molded of a translucent or transparent material, such as polycarbonate or acrylic, or equivalent material. Graphical elements are coated, for example with painting or pad printing, onto front housing 12 in the desired locations. In this embodiment the coloration used for the graphical elements is opaque. When power is supplied to the backlighting source, light passes through the housing. Illumination of the housing then causes the graphical elements to be more pronounced and visible to the user. In this embodiment an EL panel is preferred as the backlighting source.

In either of the first or second embodiments, an in-mold decorating process can be used to create the housing and graphical elements thereon. This process is well known in the art and will not be described here. In-mold decorating produces more precise graphical elements that form a part of the molded product, unlike painted and pad-printed graphical elements. Either a negative image of the graphics or opaque graphics can be created with in-mold decorating. However, in-mold decorating requires a customized mold for the desired graphics configuration.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A mobile handset comprising:
   a housing having a plurality of key openings that include alphanumeric key openings and a transparent area adjacent each of the key openings that is integrally associated with a front portion of the housing;
   a graphical element positioned adjacent each alphanumeric key opening and on the transparent area, each graphical element being indicative of an alphanumeric key function, wherein each graphical element is located on the corresponding transparent area in the front portion of the housing;
   an electroluminescent panel within the mobile handset and constructed to illuminate at least a portion of the transparent area; and
   a keypad disposed between the housing and the electroluminescent panel, the keypad comprising a plurality of alphanumeric keys that protrude through the housing.

2. The device of claim 1 wherein each transparent area comprises a translucent area.

3. The device of claim 1 further comprising at least one layer of an opaque coating upon at least a portion of the transparent area.

4. The device of claim 3 wherein the graphical element comprises a negative image within the coating.

5. The device of claim 4 wherein the graphical element comprises at least one type of graphical element selected from the group consisting of laser-etched graphical elements, pad-printed graphical elements, and in-mold decorated graphical elements.

6. The device of claim 1 wherein the graphical element comprises at least one type of graphical element selected from the group consisting of painted opaque graphical elements, pad-printed opaque graphical elements, and in-mold decorated opaque graphical elements.

7. The device of claim 1 wherein the housing and the graphical element comprise an in-molded graphical element.

8. The device of claim 7 further comprising at least one layer of an opaque coating on the non-graphics surface area of the housing.

9. The device of claim 7 further comprising at least one layer of an opaque coating on the graphics surface area of the housing.

10. A mobile handset comprising:
    a translucent housing having an outer surface an inner surface, and a plurality of key openings that include alphanumeric key openings;
    at least one layer of an opaque coating upon at least said outer surface of the translucent housing;
    a plurality of graphical elements located on at least the translucent housing outer surface, wherein each graphical elements positioned adjacent the alphanumeric key openings on the translucent housing and being indicative of a key function, and comprising a negative image within the coating so as to expose the translucent housing outer surface through the graphical elements;
    a backlighting source located within said housing for enhancing the visibility of the graphical elements, the backlighting source comprising an electroluminescent panel;
    a keypad disposed between the translucent housing and the electroluminescent panel, the keypad comprising a plurality of alphanumeric keys that protrude through the translucent housing.

11. In a mobile handset comprising a split housing defining front and back portions, the front portion interfacing with a key pad that includes a plurality of alphanumeric keys arranged in a convenient manner to permit user access to telephonic functions, a power source, a backlighting source including an electroluminescent panel, and graphical elements including a plurality of symbols each corresponding to one or more telephonic functions, the improvement comprising:
    at least the front portion of the housing formed from light transmitting material and having a plurality of key openings that include alphanumeric key openings;
    an opaque layer covering selected portions of the light transmitting housing front portion defining the edges of the graphical elements, wherein the graphical elements are located on the front portion of the light transmitting housing and adjacent each alphanumeric key opening;
    the electroluminescent panel arranged within the housing so that visible light from the electroluminescent panel is emitted through areas of the housing front portions not covered by the opaque; and a
    a keypad disposed between the housing and the electroluminescent panel, the keypad comprising a plurality of alphanumeric keys that protrude through the front portion of the housing.

* * * * *